(12) United States Patent
Prins et al.

(10) Patent No.: US 12,097,451 B2
(45) Date of Patent: Sep. 24, 2024

(54) METHOD FOR CONTROLLING A VAPOUR COMPRESSION SYSTEM DURING GAS BYPASS VALVE MALFUNCTION

(71) Applicant: Danfoss A/S, Nordborg (DK)

(72) Inventors: Jan Prins, Nordborg (DK); Frede Schmidt, Sønderborg (DK); Kenneth Bank Madsen, Nordborg (DK); Kristian Fredslund, Haderslev (DK)

(73) Assignee: DANFOSS A/S, Nordborg (DK)

( * ) Notice: Subject to any disclaimer, the term of this patent is extended or adjusted under 35 U.S.C. 154(b) by 815 days.

(21) Appl. No.: 16/461,938

(22) PCT Filed: Nov. 15, 2017

(86) PCT No.: PCT/EP2017/079359
§ 371 (c)(1),
(2) Date: May 17, 2019

(87) PCT Pub. No.: WO2018/095786
PCT Pub. Date: May 31, 2018

(65) Prior Publication Data
US 2019/0299132 A1    Oct. 3, 2019

(30) Foreign Application Priority Data
Nov. 22, 2016  (DK) .............................. PA201600722

(51) Int. Cl.
*B01D 35/147*      (2006.01)
*F25B 1/10*         (2006.01)
(Continued)

(52) U.S. Cl.
CPC ............ *B01D 35/1475* (2013.01); *F25B 1/10* (2013.01); *F25B 49/02* (2013.01); *F25B 49/022* (2013.01);
(Continued)

(58) Field of Classification Search
CPC ...... F25B 2600/2507; F25B 2600/2517; F25B 2600/2525; F25B 2600/25
See application file for complete search history.

(56) References Cited

U.S. PATENT DOCUMENTS 4,209,996 A    7/1980  Shaw
5,276,630 A    1/1994  Baldwin et al.
(Continued)

FOREIGN PATENT DOCUMENTS

CN    1563825 A    1/2005
CN    1788186 A    6/2006
(Continued)

OTHER PUBLICATIONS

International Search Report for Serial No. PCT/EP2017/079360 dated Mar. 20, 2018.
(Continued)

*Primary Examiner* — Jianying C Atkisson
*Assistant Examiner* — Meraj A Shaikh
(74) *Attorney, Agent, or Firm* — McCormick, Paulding & Huber PLLC

(57) ABSTRACT

A method for controlling a vapour compression system (1) is disclosed. Malfunctioning of a gas bypass valve (8) is registered. An actual opening degree of the gas bypass valve (8) is derived, and a target opening degree of the gas bypass valve (8) is derived, based on one or more control parameters of the vapour compression system (1). The actual opening degree is compared to the target opening degree, and the vapour compression system (1) is controlled based on the comparison, and in order to match a mass flow of gaseous refrigerant through the gas bypass valve (8) to the actual opening degree of the gas bypass valve (8).

17 Claims, 5 Drawing Sheets

(51) Int. Cl.
*F25B 49/02* (2006.01)
*F25B 41/00* (2021.01)
*F25B 41/39* (2021.01)

(52) U.S. Cl.
CPC ............... *F25B 41/00* (2013.01); *F25B 41/39* (2021.01); *F25B 2309/14* (2013.01); *F25B 2341/0012* (2013.01); *F25B 2400/075* (2013.01); *F25B 2400/23* (2013.01); *F25B 2500/19* (2013.01); *F25B 2600/0253* (2013.01); *F25B 2600/111* (2013.01); *F25B 2600/2509* (2013.01); *F25B 2600/2513* (2013.01); *F25B 2700/193* (2013.01); *F25B 2700/1931* (2013.01); *F25B 2700/195* (2013.01); *F25B 2700/21152* (2013.01); *F25B 2700/21163* (2013.01); *Y02B 30/70* (2013.01)

(56) References Cited

U.S. PATENT DOCUMENTS

| | | | |
|---|---|---|---|
| 5,440,895 | A | 8/1995 | Bahel et al. |
| 6,357,241 | B1 | 3/2002 | Dudley |
| 7,481,100 | B2 | 1/2009 | Ponziani et al. |
| 10,486,499 | B2 * | 11/2019 | Stanke ............... B60H 1/00978 |
| 2003/0055603 | A1 | 3/2003 | Rossi et al. |
| 2003/0101739 | A1 | 6/2003 | Moon et al. |
| 2005/0126190 | A1 | 6/2005 | Lifson et al. |
| 2005/0251364 | A1 | 11/2005 | Kang et al. |
| 2007/0095085 | A1 | 5/2007 | Liu |
| 2008/0022706 | A1 | 1/2008 | Sakimichi et al. |
| 2009/0260375 | A1 | 10/2009 | Miyazaki et al. |
| 2014/0150489 | A1 | 6/2014 | Gan et al. |
| 2014/0208785 | A1 | 7/2014 | Wallace et al. |
| 2015/0096321 | A1 | 4/2015 | Kawano et al. |
| 2015/0143841 | A1 * | 5/2015 | Kawano ................. F25B 13/00 62/498 |
| 2016/0102901 | A1 * | 4/2016 | Christensen ............ F25B 9/008 62/196.4 |
| 2016/0200176 | A1 * | 7/2016 | Stanke ............... B60H 1/00978 62/126 |
| 2016/0341450 | A1 * | 11/2016 | Minami ................. F25B 49/02 |
| 2019/0299132 | A1 | 10/2019 | Prins et al. |

FOREIGN PATENT DOCUMENTS

| | | |
|---|---|---|
| CN | 101504178 A | 8/2009 |
| CN | 102519119 A | 6/2012 |
| EP | 3023712 A1 | 5/2016 |
| KR | 20160032197 A | 3/2016 |

OTHER PUBLICATIONS

International Search Report for Serial No. PCT/EP2017/079358 dated Feb. 9, 2018.
Indian First Examination Report for Application No. 201917014392 dated Jan. 18, 2021.
Xin-Hua Xu et al., "Experimental Study on Sensor Fault Detection and Diagnosis and Estimation of Centrifugal Chiller System," Building Science, vol. 23, No. 6, dated Jun. 2007, and its English abstract.
International Search Report For Serial No. PCT/EP2017/079359 Dated Jan. 25, 2018.

* cited by examiner

METHOD FOR CONTROLLING A VAPOUR COMPRESSION SYSTEM DURING GAS BYPASS VALVE MALFUNCTION

CROSS-REFERENCE TO RELATED APPLICATIONS

This application is a National Stage application of International Patent Application No. PCT/EP2017/079359, filed on Nov. 15, 2017, which claims priority to Danish Patent Application No. PA201600722, filed on Nov. 22, 2016, each of which is hereby incorporated by reference in its entirety.

TECHNICAL FIELD

The present invention relates to a method for controlling a vapour compression system, such as a refrigeration system, a heat pump or an air condition system, in which the vapour compression system is allowed to keep operating if a gas bypass valve, interconnecting a gaseous outlet of a receiver and an inlet of a compressor, is malfunctioning.

BACKGROUND

Vapour compression systems, such as refrigeration systems, heat pumps or air condition systems, are normally controlled in order to provide a required cooling or heating capacity in an as energy efficient manner as possible. Some vapour compression systems are provided with a receiver arranged in the refrigerant path downstream relative to an outlet of a heat rejecting heat exchanger and upstream relative to an expansion device arranged to supply refrigerant to an evaporator. In the receiver, refrigerant is separated into liquid refrigerant and gaseous refrigerant. The liquid part of the refrigerant is supplied to the expansion device, via a liquid outlet of the receiver. At least some of the gaseous part of the refrigerant may be supplied directly to an inlet of a compressor, via a gaseous outlet of the receiver and a gas bypass valve. The mass flow of gaseous refrigerant from the gaseous outlet of the receiver towards the inlet of the compressor can be controlled by controlling an opening degree of the gas bypass valve.

In the case that the gas bypass valve malfunctions, it may be stuck in a certain position defining a certain opening degree of the valve. In this case it is no longer possible to control the mass flow of gaseous refrigerant from the gaseous outlet of the receiver towards the inlet of the compressor. During normal operation of a vapour compression system, the opening degree of the gas bypass valve may vary to a great extent, in order to meet system requirements, adapt to ambient conditions, and allow the vapour compression system to provide a required cooling or heating capacity. Therefore, the opening degree defined by the malfunctioning gas bypass valve will most likely not match a desired opening degree most of the time. This may lead to situations in which the vapour compression system becomes unstable or is not capable of providing a required cooling or heating capacity, if the vapour compression system continues operating without controlling the opening degree of the gas bypass valve. Accordingly, it may be necessary to shut down the vapour compression system and to request immediate service on the system. This is very undesirable and may be very costly.

SUMMARY

It is an object of embodiments of the invention to provide a method for controlling a vapour compression system, in which the vapour compression system is allowed to continue operating in the case of gas bypass valve malfunction.

It is a further object of embodiments of the invention to provide a method for controlling a vapour compression system, in which the number of shut down events are reduced as compared to prior art methods.

The invention provides a method for controlling a vapour compression system, the vapour compression system comprising at least one compressor, a heat rejecting heat exchanger, a high pressure expansion device, a receiver, an evaporator expansion device, an evaporator and a gas bypass valve, arranged in a refrigerant path, the method comprising the steps of:

registering that the gas bypass valve is malfunctioning,
deriving an actual opening degree of the gas bypass valve,
deriving a target opening degree of the gas bypass valve, based on one or more control parameters of the vapour compression system,
comparing the actual opening degree of the gas bypass valve to the target opening degree of the gas bypass valve, and
controlling the vapour compression system based on the comparison, and in order to match a mass flow of gaseous refrigerant through the gas bypass valve to the actual opening degree of the gas bypass valve.

The method according to the invention is a method for controlling a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system could, e.g., be a refrigeration system, an air condition system or a heat pump.

The vapour compression system comprises at least one compressor, a heat rejecting heat exchanger, a high pressure expansion device, a receiver, an evaporator expansion device, an evaporator and a gas bypass valve, arranged in a refrigerant path. Refrigerant flowing in the refrigerant path is compressed by the compressor(s) before being supplied to the heat rejecting heat exchanger. In the heat rejecting heat exchanger, heat exchange takes place between the refrigerant and the ambient or a secondary fluid flow across the heat rejecting heat exchanger, in such a manner that heat is rejected from the refrigerant flowing through the heat rejecting heat exchanger. The heat rejecting heat exchanger may be in the form of a condenser, in which case at least part of the refrigerant passing through the heat rejecting heat exchanger is condensed, and the refrigerant leaving the heat rejecting heat exchanger is, in this case, at least partly in a liquid state. As an alternative, the heat rejecting heat exchanger may be in the form of a gas cooler, in which case the refrigerant passing through the heat rejecting heat exchanger is cooled, but remains in a gaseous state.

The refrigerant leaving the heat rejecting heat exchanger passes through the high pressure expansion device before being supplied to the receiver. In the high pressure expansion device, the refrigerant undergoes expansion, and the refrigerant received in the receiver is therefore a mixture of liquid and gaseous refrigerant. The high pressure expansion device may, e.g., be in the form of a high pressure valve. As an alternative, the high pressure expansion device may be in the form of an ejector. As another alternative, the high pressure expansion device may include at least one high pressure valve and at least one ejector arranged in parallel.

In the receiver the refrigerant is separated into a liquid part and a gaseous part. The liquid part of the refrigerant is supplied to the evaporator expansion device, via a liquid outlet of the receiver. The evaporator expansion device controls a supply of refrigerant to the evaporator, and the refrigerant undergoes expansion when passing through the evaporator expansion device. Accordingly, the refrigerant being supplied to the evaporator is a mixture of liquid and gaseous refrigerant. The evaporator expansion device may, e.g., be in the form of an expansion valve.

In the evaporator the liquid part of the refrigerant is evaporated, while heat exchange takes place between the refrigerant and the ambient or a secondary fluid flow across the evaporator, in such a manner that heat is absorbed by the refrigerant passing through the evaporator. Finally, the refrigerant is supplied to an inlet of the compressor(s).

At least part of the gaseous part of the refrigerant in the receiver may be supplied directly to the inlet of the compressor(s), via a gaseous outlet of the receiver and the gas bypass valve. Accordingly, the gas bypass valve controls the supply of gaseous refrigerant from the receiver to the compressor(s).

According to the method of the invention, it is initially registered that the gas bypass valve is malfunctioning. As described above, when the gas bypass valve malfunctions, it is no longer possible to control the supply of gaseous refrigerant from the receiver to the compressor(s).

Next, an actual opening degree of the gas bypass valve is derived. The actual opening degree may, e.g., be an opening degree at which the gas bypass valve is stuck. The actual opening degree of the gas bypass valve may be retrieved from a controller used for controlling the gas bypass valve. However, when the gas bypass valve is malfunctioning, the opening degree which is registered by the controller may differ from the actual opening degree, e.g. because the gas bypass valve is stuck, and has therefore not adjusted the opening degree to a position specified by the controller. Accordingly, it will often be necessary to derive the actual opening degree in another manner. This will be described in further detail below.

Furthermore, a target opening degree of the gas bypass valve is derived, based on one or more control parameters of the vapour compression system. Thus, the target opening degree of the gas bypass valve is an opening degree which provides an optimal mass flow of gaseous refrigerant from the gaseous outlet of the receiver towards the inlet of the compressor(s), under the prevailing operating conditions. Accordingly, if the gas bypass valve had not been malfunctioning, the opening degree of the gas bypass valve would have been set to the target opening degree.

Next, the actual opening degree of the gas bypass valve is compared to the target opening degree of the gas bypass valve. Thereby it is revealed how much the actual opening degree of the gas bypass valve is off relative to the target opening degree.

Finally, the vapour compression system is controlled based on the comparison, and in order to match a mass flow of gaseous refrigerant through the gas bypass valve to the actual opening degree of the gas bypass valve.

Thus, under normal operation of the vapour compression system, where the gas bypass valve is fully operational, the opening degree of the gas bypass valve is controlled in order to provide a mass flow of gaseous refrigerant from the gaseous outlet of the receiver towards the inlet of the compressor(s) which matches the given operating conditions. However, when the gas bypass valve is malfunctioning, the vapour compression system is instead operated in such a manner that the operating conditions are adjusted to match the actual opening degree of the gas bypass valve, in the sense that the mass flow of gaseous refrigerant through the gas bypass valve is adjusted to match the actual opening degree of the gas bypass valve. Thereby the disadvantages related to a mismatch between operating conditions and a gas bypass valve being stuck at a fixed opening degree are avoided, and operation of the vapour compression system can be continued, at least for a limited period of time, until service personnel arrives to repair or replace the malfunctioning gas bypass valve. Thereby shut down of the vapour compression system and possible damage to goods stored in display cases of the vapour compression system is avoided.

The step of controlling the vapour compression system based on the comparison may comprise the steps of:
  in the case that the comparison reveals that the actual opening degree of the gas bypass valve is larger than the target opening degree of the gas bypass valve, controlling the vapour compression system to increase the mass flow of gaseous refrigerant through the gas bypass valve, and
  in the case that the comparison reveals that the actual opening degree of the gas bypass valve is smaller than the target opening degree of the gas bypass valve, controlling the vapour compression system to decrease the mass flow of gaseous refrigerant through the gas bypass valve.

According to this embodiment, in the case that it is revealed that the actual opening degree of the gas bypass valve is larger than the target opening degree of the gas bypass valve, then the gas bypass valve has more capacity than requested by the current operating conditions. Accordingly, in this case it is desirable to adjust the operating conditions in such a manner that the mass flow of gaseous refrigerant through the gas bypass valve is increased. Thereby the actual flow of gaseous refrigerant through the gas bypass valve is adjusted to match the higher capacity defined by the actual opening degree of the gas bypass valve.

Similarly, in the case that it is revealed that the actual opening degree of the gas bypass valve is smaller than the target opening degree of the gas bypass valve, then the gas bypass valve has less capacity than requested by the current operating conditions. Accordingly, in this case it is desirable to adjust the operating conditions in such a manner that the mass flow of gaseous refrigerant through the gas bypass valve is decreased. Thereby the actual flow of gaseous refrigerant through the gas bypass valve is adjusted to match the lower capacity defined by the actual opening degree of the gas bypass valve.

The step of increasing the mass flow of gaseous refrigerant through the gas bypass valve may comprise decreasing a pressure of refrigerant leaving the heat rejecting heat exchanger and/or increasing a temperature of refrigerant leaving the heat rejecting heat exchanger.

When a pressure of refrigerant leaving the heat rejecting heat exchanger is decreased, the gas to liquid ratio of refrigerant in the receiver is increased. Thereby the mass flow of gaseous refrigerant through the gas bypass valve is increased.

The pressure of refrigerant leaving the heat rejecting heat exchanger could, e.g., be decreased by increasing an opening degree of the high pressure expansion device.

When a temperature of refrigerant leaving the heat rejecting heat exchanger is increased, the gas to liquid ratio of refrigerant in the receiver is increased. Thereby the mass flow of gaseous refrigerant through the gas bypass valve is increased.

The temperature of refrigerant leaving the heat rejecting heat exchanger could, e.g., be decreased by increasing a fan speed of a fan controlling a secondary fluid flow across the heat rejecting heat exchanger.

Similarly, the step of decreasing the mass flow of gaseous refrigerant through the gas bypass valve may comprise increasing a pressure of refrigerant leaving the heat rejecting heat exchanger and/or decreasing a temperature of refrigerant leaving the heat rejecting heat exchanger.

When a pressure of refrigerant leaving the heat rejecting heat exchanger is increased, the gas to liquid ratio of refrigerant in the receiver is decreased. Thereby the mass flow of gaseous refrigerant through the gas bypass valve is decreased.

The pressure of refrigerant leaving the heat rejecting heat exchanger could, e.g., be increased by decreasing an opening degree of the high pressure expansion device.

When a temperature of refrigerant leaving the heat rejecting heat exchanger is decreased, the gas to liquid ratio of refrigerant in the receiver is decreased. Thereby the mass flow of gaseous refrigerant through the gas bypass valve is decreased.

The temperature of refrigerant leaving the heat rejecting heat exchanger could, e.g., be increased by decreasing a fan speed of a fan controlling a secondary fluid flow across the heat rejecting heat exchanger.

The step of controlling the vapour compression system based on the comparison step may comprise adjusting an opening degree of the high pressure expansion device, adjusting a secondary fluid flow across the heat rejecting heat exchanger and/or adjusting a compressor capacity of the compressor(s).

As described above, adjusting an opening degree of the high pressure expansion device will result in a change in the mass flow of gaseous refrigerant through the gas bypass valve, since an increase in the opening degree of the high pressure expansion device results in a decrease in the pressure of refrigerant leaving the heat rejecting heat exchanger, and a decrease in the opening degree of the high pressure expansion device results in an increase in the pressure of refrigerant leaving the heat rejecting heat exchanger.

Furthermore, as described above, adjusting a secondary fluid flow across the heat rejecting heat exchanger, e.g. by adjusting a fan speed of a fan controlling the secondary fluid flow, will result in a change in the mass flow of refrigerant through the gas bypass valve. More particularly, an increase in the secondary fluid flow across the heat rejecting heat exchanger results in a decrease in the temperature of refrigerant leaving the heat rejecting heat exchanger, and a decrease in the secondary fluid flow across the heat rejecting heat exchanger results in an increase in the temperature of refrigerant leaving the heat rejecting heat exchanger.

Finally, adjusting a compressor capacity of the compressor(s) results in a change in the pressure in the suction line, and thereby in a change in the pressure difference across the gas bypass valve. Thus, increasing the compressor capacity results in a decrease in the pressure in the suction line, and thereby in an increase in the pressure difference across the gas bypass valve. This will, in turn, result in an increase in the mass flow of gaseous refrigerant through the gas bypass valve. Similarly, decreasing the compressor capacity results in an increase in the pressure in the suction line, and thereby in a decrease in the pressure difference across the gas bypass valve. This will, in turn, result in a decrease in the mass flow of gaseous refrigerant through the gas bypass valve.

The vapour compression system may be of a kind which comprises one or more main compressors and one or more receiver compressors. In this case the main compressor(s) is/are connected to the outlet of the evaporator as well to the gaseous outlet of the receiver, via the gas bypass valve, and the receiver compressor(s) is/are connected directly to the gaseous outlet of the receiver. In this case adjusting the compressor capacity could include adjusting the compressor capacity of the receiver compressor(s). Increasing the compressor capacity of the receiver compressor(s) results in an increased mass flow of gaseous refrigerant from the receiver to the receiver compressor(s). Thereby the pressure prevailing inside the receiver is decreased, thereby decreasing the pressure difference across the gas bypass valve, and decreasing the mass flow of gaseous refrigerant through the gas bypass valve. Similarly, decreasing the compressor capacity of the receiver compressor(s) results in a decreased mass flow of gaseous refrigerant from the receiver to the receiver compressor(s). Thereby the pressure prevailing inside the receiver is increased, thereby increasing the pressure difference across the gas bypass valve, and increasing the mass flow of gaseous refrigerant through the gas bypass valve.

The step of deriving an actual opening degree of the gas bypass valve may comprise the steps of:
  obtaining one or more refrigerant pressure values and one or more refrigerant temperature values at selected positions along the refrigerant path,
  estimating a mass flow of gaseous refrigerant through the gas bypass valve, based on the obtained refrigerant pressure value(s) and refrigerant temperature value(s), and
  deriving the actual opening degree of the gas bypass valve based on the estimated mass flow of gaseous refrigerant through the gas bypass valve.

According to this embodiment, the mass flow of gaseous refrigerant through the gas bypass valve is estimated from measurements of prevailing refrigerant pressures and/or refrigerant temperatures at selected positions along the refrigerant path. For instance, based on the pressure prevailing in the receiver and the pressure prevailing in the suction line, a pressure difference across the gas bypass valve can be derived. The mass flow of gaseous refrigerant through the gas bypass valve can be derived from this pressure difference. However, other refrigerant pressure values and/or refrigerant temperature values could be used for estimating the mass flow of refrigerant in relevant parts of the vapour compression system, and this can be used for estimating the mass flow of gaseous refrigerant through the gas bypass valve.

Once the estimated mass flow of gaseous refrigerant through the gas bypass valve has been obtained in this manner, the actual opening degree of the gas bypass valve, which results in this mass flow, can be derived. This could, e.g., be done using a model providing correspondence between opening degree of the gas bypass valve and mass flow of gaseous refrigerant through the gas bypass valve. The model could, e.g., be obtained in an empirical manner during normal operation of the vapour compression system.

The step of deriving an actual opening degree of the gas bypass valve may be performed based on valve characteristics of the gas bypass valve obtained during normal operation of the gas bypass valve. This may, e.g., be performed in the manner described above.

The step of deriving a target opening degree of the gas bypass valve may be based on at least an obtained value of a pressure prevailing inside the receiver. The gas bypass valve is often controlled based on the pressure prevailing in the receiver, and in order to obtain an appropriate pressure level inside the receiver. For instance, in the case that the pressure prevailing inside the receiver is too high, the opening degree of the gas bypass valve may be increased in order to increase the mass flow of gaseous refrigerant from the receiver towards the compressors, thereby reducing the pressure prevailing inside the receiver. Similarly, in the case that the pressure prevailing inside the receiver is too low, the opening degree of the gas bypass valve may be decreased in order to decrease the mass flow of gaseous refrigerant from the receiver towards the compressors, thereby increasing the pressure prevailing inside the receiver. Accordingly, the pressure prevailing inside the receiver provides a suitable indication regarding a target opening degree for the gas bypass valve, which would match the prevailing operating conditions.

The step of controlling the vapour compression system may be performed in such a manner that a compressor capacity of the compressor(s) is not allowed to decrease below a minimum compressor capacity level. According to this embodiment, it is always ensured that at least one compressor is operated at least at a minimum compressor speed. In the case that the compressor capacity of the compressor(s) decreases below a certain minimum level, there is a risk that the vapour compression system is brought into a state where it is not possible to provide the required cooling or heating capacity, and the vapour compression system may stop operating. It may be necessary to manually restart the vapour compression system in this case. By ensuring that the compressor capacity of the compressor(s) is not allowed to decrease below the minimum compressor capacity level, such a situation is avoided.

Alternatively or additionally, the method may further comprise the step of forcing the compressor(s) to start at predefined time intervals. This will also ensure that the situation described above is avoided.

BRIEF DESCRIPTION OF THE DRAWINGS

The invention will now be described in further detail with reference to the accompanying drawings in which.

DETAILED DESCRIPTION

Figure 1:
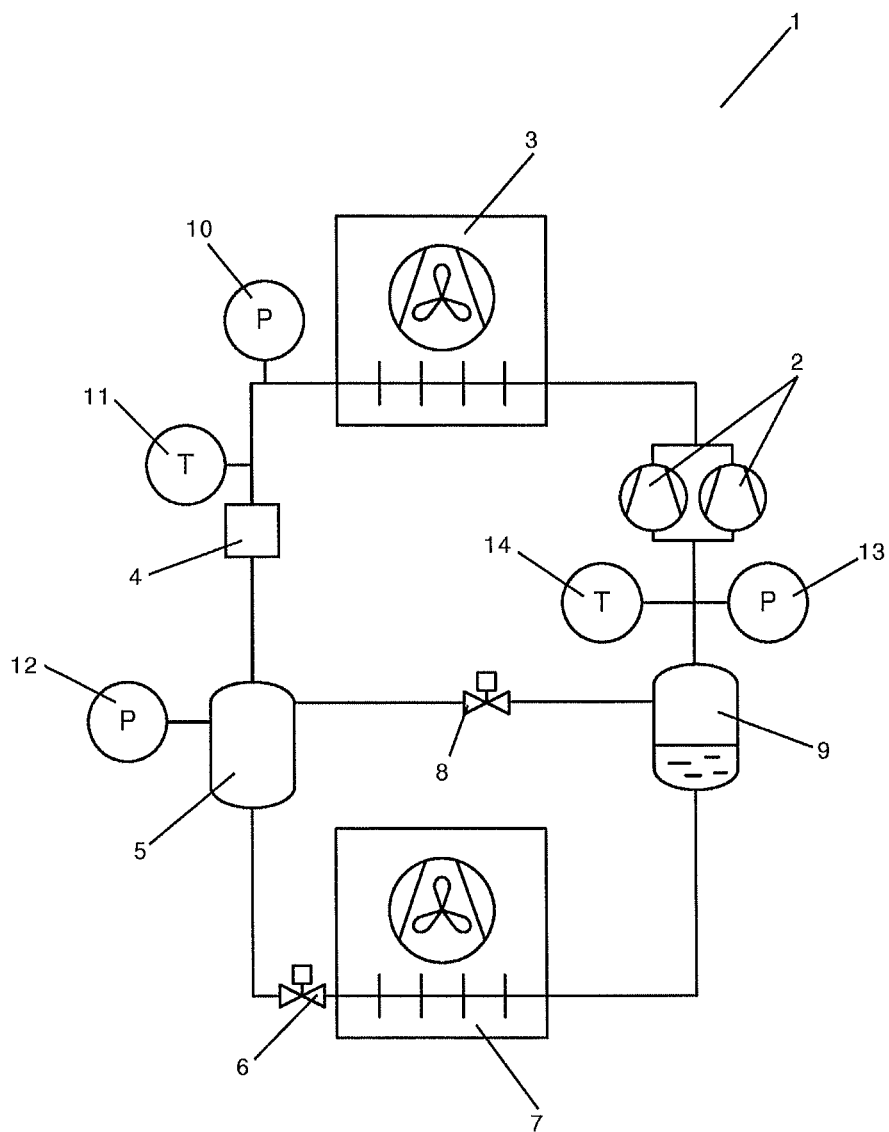
FIG. 1 is a diagrammatic view of a vapour compression system being controlled using a method according to a first embodiment of the invention.

FIG. 1 is a diagrammatic view of a vapour compression system 1 being controlled using a method according to a first embodiment of the invention. The vapour compression system 1 comprises a compressor unit comprising a number of compressors 2, two of which are shown, a heat rejecting heat exchanger 3, a high pressure expansion device 4, a receiver 5, an evaporator expansion device 6, in the form of an expansion valve, an evaporator 7, a gas bypass valve 8 and a suction line receiver 9 arranged in a refrigerant path.

Refrigerant flowing in the refrigerant path is compressed by the compressors 2 before being supplied to the heat rejecting heat exchanger 3. In the heat rejecting heat exchanger 3, heat exchange takes place with a secondary fluid flow across the heat rejecting heat exchanger 3 in such a manner that heat is rejected from the refrigerant. In the case that the heat rejecting heat exchanger 3 is in the form of a condenser, the refrigerant passing through the heat rejecting heat exchanger 3 is at least partly condensed. In the case that the heat rejecting heat exchanger 3 is in the form of a gas cooler, the refrigerant passing through the heat rejecting heat exchanger 3 is cooled, but it remains in a gaseous state.

The refrigerant leaving the heat rejecting heat exchanger 3 is passed through the high pressure expansion device 4 before being supplied to the receiver 5. The high pressure expansion device 4 may, e.g., be in the form of a high pressure valve, in the form of an ejector, or in the form of a high pressure valve and an ejector arranged in parallel. In any event, refrigerant passing through the high pressure expansion device 4 undergoes expansion.

In the receiver 5, the refrigerant is separated into a liquid part and a gaseous part. The liquid part of the refrigerant is supplied to the evaporator expansion device 6, where it undergoes expansion before being supplied to the evaporator 7. In the evaporator 7, heat exchange takes place with a secondary fluid flow across the evaporator 7 in such a manner that heat is absorbed by the refrigerant, while the refrigerant is at least partly evaporated. The refrigerant leaving the evaporator 7 is supplied to the suction line receiver 9, where it is separated into a liquid part and a gaseous part. The gaseous part of the refrigerant is supplied to the compressors 2.

At least part of the gaseous part of the refrigerant in the receiver 5 is supplied to the suction line receiver 9, via the gas bypass valve 8. Thus, the refrigerant leaving the evaporator 7 is mixed with gaseous refrigerant supplied from the receiver 5 in the suction line receiver 9. The mass flow of gaseous refrigerant from the receiver 5 towards the suction line receiver 9, and thereby towards the compressors 2, is, under normal operating conditions, controlled by controlling an opening degree of the gas bypass valve 8.

The vapour compression system 1 is further provided with a number of sensors arranged at selected positions along the refrigerant path. A pressure sensor 10 is arranged near the outlet of the heat rejecting heat exchanger 3 for measuring the pressure of refrigerant leaving the heat rejecting heat exchanger 3. A temperature sensor 11 is arranged near the outlet of the heat rejecting heat exchanger 3 for measuring the temperature of refrigerant leaving the heat rejecting heat exchanger 3. A pressure sensor 12 is arranged in the receiver 5 for measuring the pressure prevailing inside the receiver 5. A pressure sensor 13 is arranged near the inlet of the compressors 2 for measuring the refrigerant pressure in the suction line. A temperature sensor 14 is arranged near the inlet of the compressors 2 for measuring the refrigerant temperature in the suction line.

The vapour compression system 1 is controlled on the basis of measurements performed by at least some of the sensors 10, 11, 12, 13, 14. For instance, the high pressure expansion device 4 may be controlled on the basis of measurements performed by pressure sensor 10 and/or measurements performed by pressure sensor 12. The evaporator expansion device 6 may be controlled on the basis of measurements performed by pressure sensor 13 and measurements performed by temperature sensor 14. The gas bypass valve 8 may be controlled on the basis of measurements performed by pressure sensor 12 and/or measurements performed by pressure sensor 13.

In the case that the gas bypass valve 8 malfunctions, it is no longer possible to control the supply of gaseous refrigerant from the receiver 5 towards the suction line receiver 9, and thereby towards the compressors 2, via the gas bypass valve 8. According to the method of the invention, continued operation of the vapour compression system 1 is allowed in the following manner.

Initially, an actual opening degree of the gas bypass valve 8 is derived. This could, e.g., include estimating a mass flow of gaseous refrigerant through the gas bypass valve, based on measurements performed by means of one or more of the sensors 10, 11, 12, 13, 14, and subsequently deriving the actual opening degree of the gas bypass valve 8, based on the estimated mass flow.

Furthermore, a target opening degree of the gas bypass valve 8 is derived, based on one or more control parameters of the vapour compression system 1. Thus, the target opening degree of the gas bypass valve 8 represents an opening degree which matches the current operating conditions, and which would be selected if the gas bypass valve 8 was operating properly.

Next, the actual opening degree of the gas bypass valve 8 is compared to the target opening degree of the gas bypass valve 8. Finally, the vapour compression system 1 is controlled, based on the comparison, and in order to match a flow of gaseous refrigerant through the gas bypass valve 8 to the actual opening degree of the gas bypass valve 8. Thus, since the opening degree of the gas bypass valve 8 can not be controlled to provide a mass flow of refrigerant through the gas bypass valve 8 which matches the current operating conditions, the operating conditions are instead adjusted to provide a mass flow of refrigerant through the gas bypass valve 8 which matches the actual opening degree of the gas bypass valve 8.

In particular, in the case that the comparison reveals that the actual opening degree of the gas bypass valve 8 is larger than the target opening degree of the gas bypass valve 8, the vapour compression system 1 is controlled to increase the mass flow of refrigerant through the gas bypass valve 8. This can, e.g., be obtained by decreasing the pressure of refrigerant leaving the heat rejecting heat exchanger 3 and/or by increasing the temperature of refrigerant leaving the heat rejecting heat exchanger 3.

Similarly, in the case that the comparison reveals that the actual opening degree of the gas bypass valve 8 is smaller than the target opening degree of the gas bypass valve 8, the vapour compression system 1 is controlled to decrease the mass flow of refrigerant through the gas bypass valve 8. This can, e.g., be obtained by increasing the pressure of refrigerant leaving the heat rejecting heat exchanger 3 and/or by decreasing the temperature of refrigerant leaving the heat rejecting heat exchanger 3.

The pressure of refrigerant leaving the heat rejecting heat exchanger 3 can, e.g., be adjusted by adjusting an opening degree of the high pressure expansion device 4 and/or by adjusting a compressor capacity of the compressors 2. The temperature of refrigerant leaving the heat rejecting heat exchanger 3 can, e.g., be adjusted by adjusting a fan speed of a fan driving a secondary fluid flow across the heat rejecting heat exchanger 3.

Figure 2:
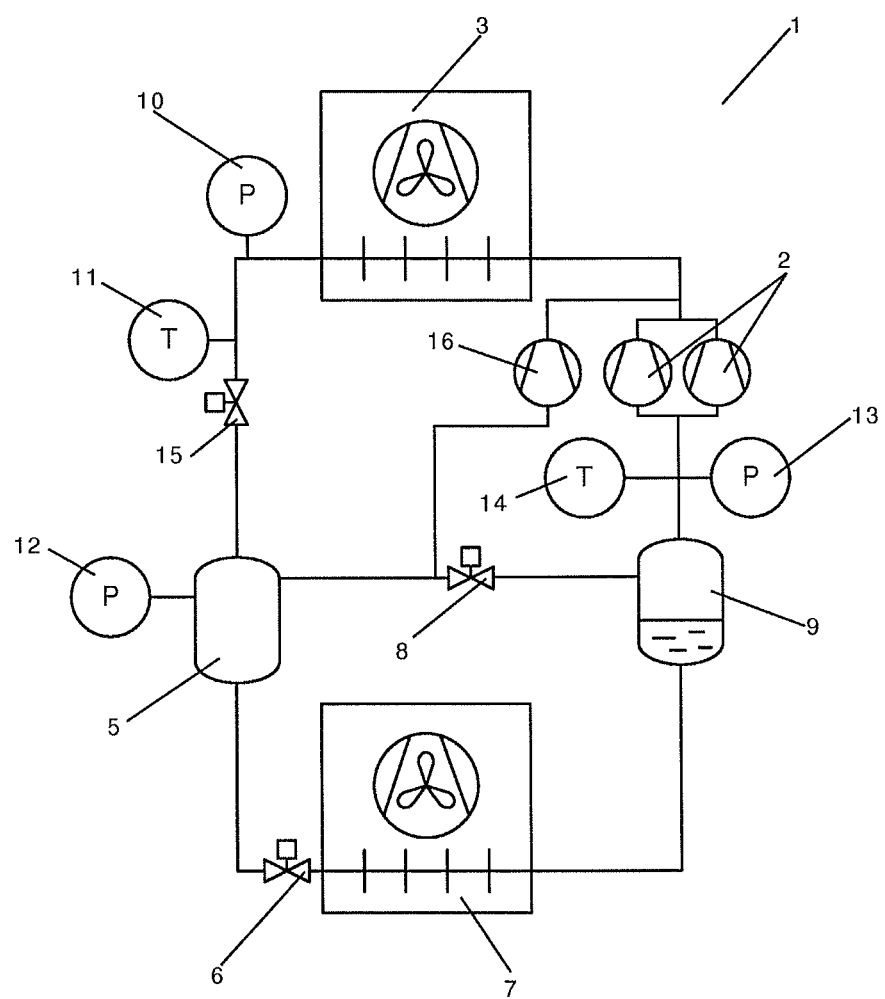
FIG. 2 is a diagrammatic view of a vapour compression system being controlled using a method according to a second embodiment of the invention.

FIG. 2 is a diagrammatic view of a vapour compression system 1 being controlled using a method according to a second embodiment of the invention. The vapour compression system 1 is very similar to the vapour compression system 1 of FIG. 1, and it will therefore not be described in detail here.

In the vapour compression system 1 of FIG. 2, the high pressure expansion device is in the form of a high pressure valve 15. Furthermore, the vapour compression system 1 comprises a receiver compressor 16. Gaseous refrigerant is supplied directly from the receiver 5 to the receiver compressor 16. Accordingly, this gaseous refrigerant is not subjected to the pressure drop which is introduced when the refrigerant passes through the gas bypass valve 8 and is mixed with the refrigerant leaving the evaporator 9. This reduces the energy required in order to compress the refrigerant.

In the case that the gas bypass valve 8 malfunctions, continued operation of the vapour compression system 1 can be ensured essentially in the manner described above with reference to FIG. 1.

Figure 3:
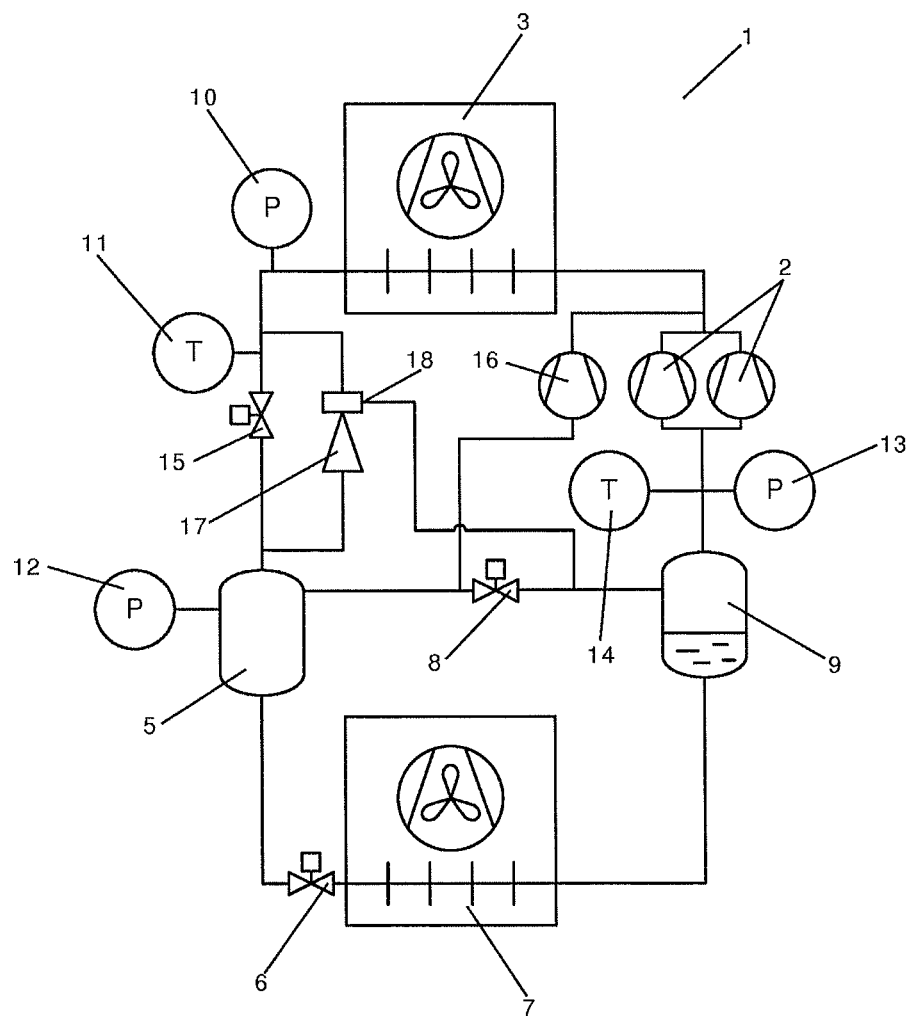
FIG. 3 is a diagrammatic view of a vapour compression system being controlled using a method according to a third embodiment of the invention.

FIG. 3 is a diagrammatic view of a vapour compression system 1 being controlled using a method according to a third embodiment of the invention. The vapour compression system 1 of FIG. 3 is very similar to the vapour compression system 1 of FIG. 2, and it will therefore not be described in detail here.

In the vapour compression system 1 of FIG. 3, the high pressure expansion device is in the form of a high pressure valve 15 and an ejector 17 arranged in parallel. Accordingly, some of the refrigerant leaving the heat rejecting heat exchanger 3 passes through the high pressure valve 15, and some of the refrigerant passes through the ejector 17 before being supplied to the receiver 5. A secondary inlet 18 of the ejector 17 is connected to the suction line. Thereby refrigerant is sucked from the suction line into the ejector 17, reducing the load on the compressors 2. This even further reduces the energy consumption of the vapour compression system 1.

In the case that the gas bypass valve 8 malfunctions, continued operation of the vapour compression system 1 can be ensured essentially in the manner described above with reference to FIG. 1.

Figure 4:
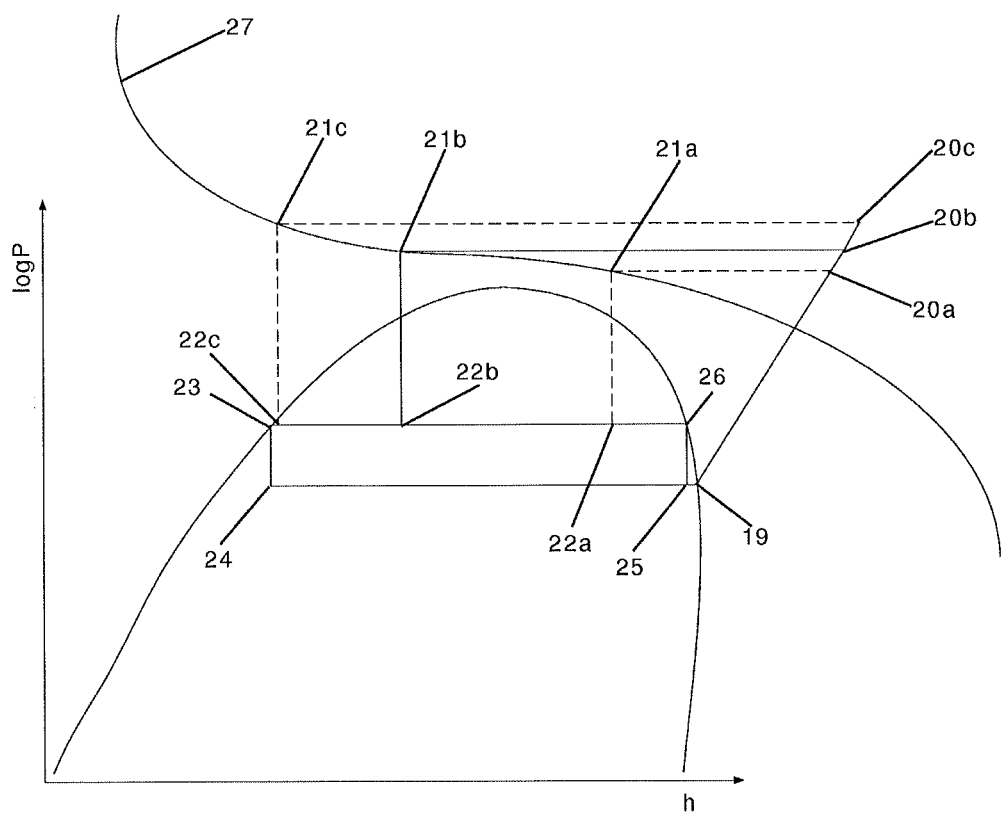
FIG. 4 is a log P-h diagram illustrating a method according to an embodiment of the invention.

FIG. 4 is a log P-h diagram illustrating a method according to an embodiment of the invention. The vapour compression system being controlled could, e.g., be one of the vapour compression systems illustrated in FIGS. 1-3.

From point 19 to point 20 refrigerant is compressed by the compressors, resulting in an increase in enthalpy and pressure. From point 20 to point 21 refrigerant passes through the heat rejecting heat exchanger, resulting in a decrease in the temperature of the refrigerant, and thereby a decrease in enthalpy, while the pressure remains substantially constant. From point 21 to point 22 the refrigerant passes through the high pressure expansion device, resulting in a decrease in pressure, while the enthalpy remains substantially constant. From point 23 to point 24 the liquid part of the refrigerant passes through the evaporator expansion device, also resulting in a decrease in pressure, while the enthalpy remains substantially constant. From point 24 to point 25 the refrigerant passes through the evaporator, resulting in an increase in the temperature of the refrigerant, and thereby an increase in enthalpy, while the pressure remains substantially constant. From point 26 to point 25 the gaseous part of the refrigerant in the receiver passes through the gas bypass valve, resulting in a decrease in pressure, while the enthalpy remains substantially constant.

In FIG. 4, three different paths, corresponding to three different pressure values of the refrigerant leaving the heat rejecting heat exchanger are illustrated. In the three paths, the temperature of refrigerant leaving the heat rejecting heat exchanger is the same, illustrated by isotherm 27. A first path, point 19-point 20*a*-point 21*a*-point 22*a*, corresponds to a low pressure value. A second path, point 19-point 20*b*-point 21*b*-point 22*b*, corresponds to a medium pressure value. A third path, point 19-point 20*c*-point 21*c*-point 22*c*, corresponds to a high pressure level. The position of point 22 along the enthalpy axis reflects the gas to liquid ratio in the receiver. The position of point 22a illustrates a situation in which the gas to liquid ratio is high, the position of point 22b illustrates a situation in which the gas to liquid ratio is medium, and the position of point 22c illustrates a situation in which the gas to liquid ratio is low. The gas to liquid ratio in the receiver affects the mass flow of gaseous refrigerant through the gas bypass valve.

Accordingly, by adjusting the pressure of the refrigerant leaving the heat rejecting heat exchanger, the gas to liquid ratio in the receiver can be adjusted, thereby adjusting the mass flow of gaseous refrigerant through the gas bypass valve. More particularly, increasing the pressure of refrigerant leaving the heat rejecting heat exchanger results in a decrease in the gas to liquid ratio of refrigerant in the receiver, and thereby in a decreased mass flow of gaseous refrigerant through the gas bypass valve. Similarly, decreasing the pressure of refrigerant leaving the heat rejecting heat exchanger results in an increase in the gas to liquid ratio of refrigerant in the receiver, and thereby in an increased mass flow of gaseous refrigerant through the gas bypass valve.

Figure 5:
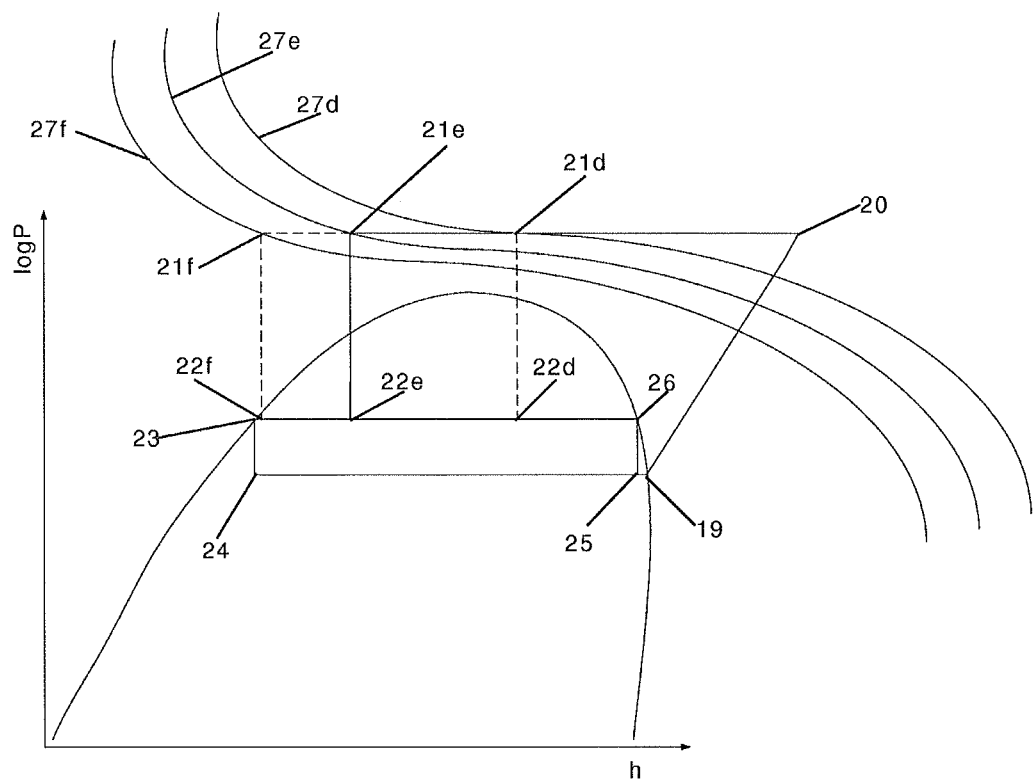
FIG. 5 is a log P-h diagram illustrating a method according to an alternative embodiment of the invention.

FIG. 5 is a log P-h diagram illustrating a method according to an alternative embodiment of the invention. The log P-h diagram of FIG. 5 is similar to the log P-h diagram of FIG. 4, and it will therefore not be described in detail here.

In FIG. 5, three different paths, corresponding to three different temperature values of the refrigerant leaving the heat rejecting heat exchanger, illustrated by three isotherms 27d, 27e, 27f, are illustrated. In the three paths, the pressure of refrigerant leaving the heat rejecting heat exchanger is the same. A first path, point 19-point 20-point 21d-point 22d, corresponds to a high temperature value. A second path, point 19-point 20-point 21e-point 22e, corresponds to a medium temperature value. A third path, point 19-point 20-point 21f-point 22f, corresponds to a low temperature value. As described above, the position of point 22 along the enthalpy axis reflects the gas to liquid ratio in the receiver, which affects the mass flow of gaseous refrigerant through the gas bypass valve.

Accordingly, by adjusting the temperature of the refrigerant leaving the heat rejecting heat exchanger, the gas to liquid ratio in the receiver can be adjusted, thereby adjusting the mass flow of gaseous refrigerant through the gas bypass valve. More particularly, increasing the temperature of refrigerant leaving the heat rejecting heat exchanger results in an increase in the gas to liquid ratio of refrigerant in the receiver, and thereby in an increased mass flow of gaseous refrigerant through the gas bypass valve. Similarly, decreasing the temperature of refrigerant leaving the heat rejecting heat exchanger results in a decrease in the gas to liquid ratio of refrigerant in the receiver, and thereby to a decreased mass flow of gaseous refrigerant through the gas bypass valve.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising at least one compressor, a heat rejecting heat exchanger, a high pressure expansion device, a receiver, an evaporator expansion device, an evaporator and a gas bypass valve, arranged in a refrigerant path, the method comprising the steps of:

registering that the gas bypass valve is malfunctioning, deriving an actual opening degree of the malfunctioning gas bypass valve, deriving a target opening degree of the malfunctioning gas bypass valve, based on one or more control parameters of the vapour compression system, comparing the actual opening degree of the malfunctioning gas bypass valve to the target opening degree of the malfunctioning gas bypass valve, and controlling the vapour compression system based on the comparison, and in order to match a mass flow of gaseous refrigerant through the malfunctioning gas bypass valve to the actual opening degree of the malfunctioning gas bypass valve;

wherein the step of deriving an actual opening degree of the malfunctioning gas bypass valve comprises the step of:

obtaining one or more refrigerant pressure values and one or more refrigerant temperature values at selected positions along the refrigerant path.

2. The method according to claim 1, wherein the step of controlling the vapour compression system based on the comparison comprises the steps of:

in the case that the comparison reveals that the actual opening degree of the malfunctioning gas bypass valve is larger than the target opening degree of the malfunctioning gas bypass valve, controlling the vapour compression system to increase the mass flow of gaseous refrigerant through the malfunctioning gas bypass valve, and in the case that the comparison reveals that the actual opening degree of the malfunctioning gas bypass valve is smaller than the target opening degree of the malfunctioning gas bypass valve, controlling the vapour compression system to decrease the mass flow of gaseous refrigerant through the malfunctioning gas bypass valve.

3. The method according to claim 2, wherein the step of increasing the mass flow of gaseous refrigerant through the malfunctioning gas bypass valve comprises decreasing a pressure of refrigerant leaving the heat rejecting heat exchanger and/or increasing a temperature of refrigerant leaving the heat rejecting heat exchanger.

4. The method according to claim 2, wherein the step of decreasing the mass flow of gaseous refrigerant through the malfunctioning gas bypass valve comprises increasing a pressure of refrigerant leaving the heat rejecting heat exchanger and/or decreasing a temperature of refrigerant leaving the heat rejecting heat exchanger.

5. The method according to claim 1, wherein the step of controlling the vapour compression system based on the comparison step comprises adjusting an opening degree of the high pressure expansion device, adjusting a secondary fluid flow across the heat rejecting heat exchanger and/or adjusting a compressor capacity of the compressor(s).

6. The method according to claim 1, wherein the step of deriving an actual opening degree of the malfunctioning gas bypass valve comprises the steps of:

estimating a mass flow of gaseous refrigerant through the malfunctioning gas bypass valve, based on the obtained refrigerant pressure value(s) and refrigerant temperature value(s), and deriving the actual opening degree of the malfunctioning gas bypass valve based on the estimated mass flow of gaseous refrigerant through the malfunctioning gas bypass valve.

7. The method according to claim 1, wherein the step of deriving a target opening degree of the malfunctioning gas bypass valve is based on at least an obtained value of a pressure prevailing inside the receiver.

8. The method according to claim 1, wherein the step of controlling the vapour compression system is performed in such a manner that a compressor capacity of the compressor(s) is not allowed to decrease below a minimum compressor capacity level.

9. The method according to claim 1, further comprising a step of forcing the compressor(s) to start at predefined time intervals.

10. The method according to claim 3, wherein the step of decreasing the mass flow of gaseous refrigerant through the malfunctioning gas bypass valve comprises increasing a pressure of refrigerant leaving the heat rejecting heat exchanger and/or decreasing a temperature of refrigerant leaving the heat rejecting heat exchanger.

11. The method according to claim 2, wherein the step of controlling the vapour compression system based on the comparison step comprises adjusting an opening degree of the high pressure expansion device, adjusting a secondary fluid flow across the heat rejecting heat exchanger and/or adjusting a compressor capacity of the compressor(s).

12. The method according to claim 3, wherein the step of controlling the vapour compression system based on the comparison step comprises adjusting an opening degree of the high pressure expansion device, adjusting a secondary fluid flow across the heat rejecting heat exchanger and/or adjusting a compressor capacity of the compressor(s).

13. The method according to claim 4, wherein the step of controlling the vapour compression system based on the comparison step comprises adjusting an opening degree of the high pressure expansion device, adjusting a secondary fluid flow across the heat rejecting heat exchanger and/or adjusting a compressor capacity of the compressor(s).

14. The method according to claim 2, wherein the step of deriving an actual opening degree of the malfunctioning gas bypass valve comprises the steps of:
   estimating a mass flow of gaseous refrigerant through the malfunctioning gas bypass valve, based on the obtained refrigerant pressure value(s) and refrigerant temperature value(s), and
   deriving the actual opening degree of the malfunctioning gas bypass valve based on the estimated mass flow of gaseous refrigerant through the malfunctioning gas bypass valve.

15. The method according to claim 3, wherein the step of deriving an actual opening degree of the malfunctioning gas bypass valve comprises the steps of:
   estimating a mass flow of gaseous refrigerant through the malfunctioning gas bypass valve, based on the obtained refrigerant pressure value(s) and refrigerant temperature value(s), and
   deriving the actual opening degree of the malfunctioning gas bypass valve based on the estimated mass flow of gaseous refrigerant through the malfunctioning gas bypass valve.

16. The method according to claim 4, wherein the step of deriving an actual opening degree of the malfunctioning gas bypass valve comprises the steps of:
   estimating a mass flow of gaseous refrigerant through the malfunctioning gas bypass valve, based on the obtained refrigerant pressure value(s) and refrigerant temperature value(s), and
   deriving the actual opening degree of the malfunctioning gas bypass valve based on the estimated mass flow of gaseous refrigerant through the malfunctioning gas bypass valve.

17. The method according to claim 5, wherein the step of deriving an actual opening degree of the malfunctioning gas bypass valve comprises the steps of:
   estimating a mass flow of gaseous refrigerant through the malfunctioning gas bypass valve, based on the obtained refrigerant pressure value(s) and refrigerant temperature value(s), and
   deriving the actual opening degree of the malfunctioning gas bypass valve based on the estimated mass flow of gaseous refrigerant through the malfunctioning gas bypass valve.

* * * * *